United States Patent [19]

Honbu et al.

[11] Patent Number: 4,549,258
[45] Date of Patent: Oct. 22, 1985

[54] INVERTER DEVICE USING GATE TURN-OFF THYRISTORS

[75] Inventors: Mitsuyuki Honbu, Katsuta; Yasuo Matsuda, Hitachi; Katsunori Suzuki, Takahagi; Yoshiki Kajita, Hitachi, all of Japan

[73] Assignees: Hitachi, Ltd., Tokyo; Hitachi Engineering Co., Ltd., Ibaraki, both of Japan

[21] Appl. No.: 471,704

[22] Filed: Mar. 3, 1983

[30] Foreign Application Priority Data

Mar. 3, 1982 [JP] Japan .................. 57-32354

[51] Int. Cl.[4] .......................................... H02M 7/515
[52] U.S. Cl. ........................................ 363/71; 363/64
[58] Field of Search .................. 363/55,56,57,58, 68, 363/69, 70, 71, 135, 136, 138, 64, 2; 318/345 G, 801, 807, 808, 811

[56] References Cited

U.S. PATENT DOCUMENTS

| | | | |
|---|---|---|---|
| 2,195,308 | 3/1940 | Herskind | 363/64 |
| 3,386,027 | 5/1968 | Kilgore | 363/68 |
| 3,943,429 | 3/1976 | Heintze | 363/71 |

OTHER PUBLICATIONS

Principles of Inverter Circuits by B. D. Bedford et al., pp. 166 to 175.
Pulswechselrichter zur Drehzahlsteuerung von Asynchronmaschin by Von Konrad Heintze et al., Siemens Zeitschrift 45(1971) pp. 154 to 161.
Hitachi Review vol. 31 (1982), No. 1, pp. 23-27, "GTO Inverter Controlled AC Traction Drives".
Silicon Controlled Rectifier Manual. Third Edition, 1964, p. 227, General Electric Company.

Primary Examiner—Peter S. Wong
Assistant Examiner—Judson H. Jones
Attorney, Agent, or Firm—Antonelli, Terry & Wands

[57] ABSTRACT

Herein disclosed is an inverter device which includes two or more groups of unit switching circuits connected in parallel with a d.c. power source and each having gate turn-off thyristors connected in series with each other. Further inclusive are current balancing reactors, which are respectively connected between the series nodes of the gate turn-off thyristors of the respective groups, and a.c. output terminals respectively leading out from intermediate points of the aforementioned reactors.

7 Claims, 5 Drawing Figures

INVERTER DEVICE USING GATE TURN-OFF THYRISTORS

BACKGROUND OF THE INVENTION

1. Field of the Invention

The present invention relates to an inverter device using gate turn-off thyristors (which will be shortly referred to as "GTO") and, more particularly, to an inverter device which is constructed to have GTOs connected in parallel so as to have its capacity increased.

2. Description of the Prior Art

An inverter device having parallel-connected GTOs is disclosed, for example, by Takashi Tsuboi and Takamasa Hori in Hitachi Review Vol. 31 (1982), No. 1, pages 23-27, "GTO Inverter Controlled AC Traction Drives" and is shown in FIG. 6 of the same. In the circuit disclosed, for each arm, two GTOs are connected in parallel through a current balancing reactor (i.e., a current balancer) AB. Moreover, the respective nodes of the positive and negative arms in U, V and W phases provide the a.c. output terminals of that inverter device.

A leakage inductance exists between the two coils of that current balancing reactor AB. In this circuit construction, therefore, when the two GTOs of each arm are turned off by the influence of that leakage inductance, an excessive voltage is applied between the anodes and cathodes of those GTOs which leads to concern that the GTOs may be broken.

In order to suppress such excessive voltage, generally speaking, a snubber circuit is connected in parallel with a GTO. This snubber circuit is constructed by connecting a capacitor C in series with a parallel connection of a resistor R and a diode CR1, as is shown in FIG. 12.8 on page 227 of "SILICON CONTROLLED RECTIFIER MANUAL, THIRD EDITION", for example, which was published in 1964 by General Electric Company. However, the snubber circuit is intrinsically provided to suppress an excessive voltage due to the wiring inductance. In order to suppress the excessive voltage generated by the leakage inductance of a current balancing reactor, therefore, it is necessary to increase the capacity of the capacitor C of the snubber circuit to such a level as corresponds to the leakage inductance of the current balancing reactor. If this capacity of the capacitor C is increased, however, the energy to be consumed by the resistor R of the snubber circuit is increased to drop the efficiency of the inverter device as a whole. Still worse, the capacitor C and the resistor R of the snubber circuit have their sizes enlarged to enlarge the inverter device.

SUMMARY OF THE INVENTION

An object of the present invention is to provide an inverter device which can enjoy a high efficiency with a small size by the use of gate turn-off thyristors.

The gist of the present invention resides in that the arrangement of a current balancing reactor is so devised that the influence of the reactor may be prevented from being exerted upon the capacitor C of a snubber circuit.

According to the present invention, more specifically, there is provided an inverter device which includes two or more groups of unit switching circuits connected in parallel with a d.c. power source and each having gate turn-off thyristors connected in series with each other such that each group may provide one phae of the inverter device, in which current balancing reactors are respectively connected between the series nodes of the gate turn-off thyristors of the respective groups, and in which respective intermediate points of the reactors provide the a.c. output terminals of the inverter device.

In an inverter device constructed of a plurality of unit inverters, on the other hand, there are connected between the corresponding a.c. output terminals of the respective unit inverters current balancing reactors which have their respective intermediate points connected with a load.

With the construction thus far described, the current balancing reactors are not included in the closed circuit "the power source—the positive arm—the negtive arm—the power source", which is established when the GTOs of the respective arms are turned off, so that their leakage inductances do not exert their influences upon the capacitors C of the snubber circuits.

DESCRIPTION OF THE PREFERRED EMBODIMENTS

Figure 1:
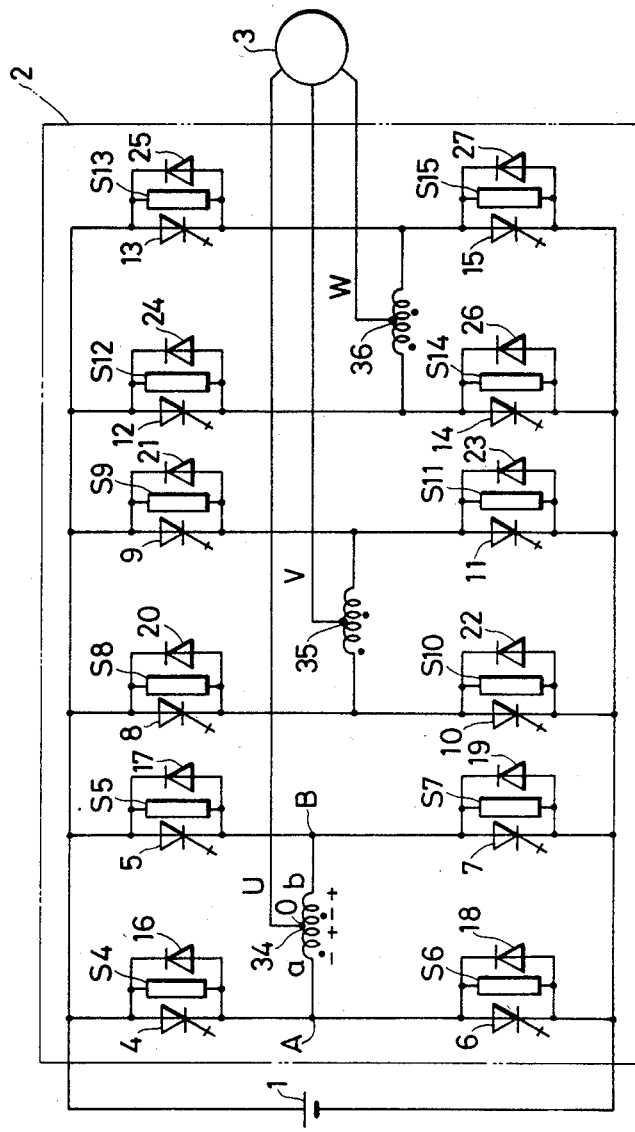
FIG. 1 is a circuit diagram showing one embodiment of the present invention.

With reference to FIG. 1 showing the circuit construction of one embodiment of the present invention, an inverter device 2 using GTOs operates to convert a d.c. voltage or current, which is supplied from a d.c. power source 1, into an a.c. voltage or current having a desired frequency, which is demanded by a load 3 (e.g., an a.c. electric motor).

The inverter device 2 is composed of six unit switching circuits which are connected in parallel with the d.c. power source 1 and each of which has GTOs connected in series with each other. Of those unit switching circuits, the group, which is composed of the unit switching circuit having its GTOs 4 and 6 connected in series and the unit switching circuit having its GTOs 5 and 7 connected in series, provides a U-phase. Between the series node A of the GTOs 4 and 6 and the series node B of the GTOs 5 and 7, there is connected a current balancing reactor 34, which has its intermediate point O leading to a U-phase a.c. output terminal. Likewise the group, which is composed of the unit switching circuit having its GTOs 8 and 10 connected in series and the unit switching circuit having its GTOs 9 and 11 connected in series, provides a V-phase. Between the series node of the GTOs 8 and 10 and the series node of the GTOs 9 and 11, there is connected a current balancing reactor 35, which has its intermediate point leading to a V-phase a.c. output terminal. Likewise, moreover, the group, which is composed of the unit switching circuit having its GTOs 12 and 14 connected in series and the unit switching circuit having its GTOs 13 and 15 connected in series, provides a W-phase. Between the series node of the GTOs 12 and 14 and the series node of the GTOs 13 and 15, there is connected a current balancing reactor 36, which has its intermediate point leading to a W-phase a.c. output terminal. Snubber circuits S4 to S15 are respectively connected in parallel with the GTOs 4 to 15 and in anti-parallel with feedback diodes 16 to 27.

Figure 2:
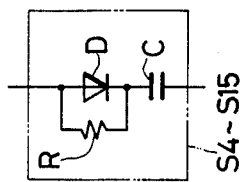
FIG. 2 is a circuit diagram showing a snubber circuit.

Each of the snubber circuits S4 to S15 is typically composed of a capacitor C, a resistor R and a diode D, as shown in FIG. 2.

The condition will now be considered in which a current is flowing from the d.c. power source 1 to the load 3 through the GTOs 4 and 5. If, in this state, the current to flow though the GTO 5 is to increase, a voltage of the shown polarity is induced in a coil a-O voltage of the reactor 34. The voltage of this polarity acts in the direction to increase the current of the GTO 4. In a coil b-O, on the other hand, there is also induced a voltage of the shown polarity, which acts in the direction to reduce the current of the GTO 5. As a result, the current of the GTO 4 is increased whereas the current of the GTO 5 is reduced so that they are held in a balanced state.

Next, the condition will be considered in which the current through the load 3 has its direction switched so that it flows through the GTOs 6 and 7. If, in this state, the current to flow through the GTO 7 is to increase, a voltage of the polarity opposite to the shown one is induced in the coil a-O of the reactor 34. The voltage of this opposite polarity acts in the direction to increase the current of the GTO 6. In the coil b-O, on the other hand, there is also induced a voltage of the polarity opposite to the shown one, which acts in the direction to reduce the current of the GTO 7. As a result, likewise the case of the GTOs 4 and 5, the current of the GTO 6 is increased whereas the current of the GTO 7 is reduced so that they are held in a balanced state. Likewise, the reactors 35 and 36 act to hold the current balances between the GTOs 8 and 9 and between the GTOs 10 and 11 and the current balances between the GTOs 12 and 13 and between the GTOs 14 and 15.

In the case of FIG. 1, since the current balancing reactor 34 is connected between the node A of the series-connected GTOs 4 and 6 and the node B of the series-connected GTOs 5 and 7, the closed circuit "1-S4-A-18-1" and "1-S5-B-19-1" contain no current balancing reactor. In other words, according to the present embodiment, the influence of the leakage inductance of the current balancing reactor 34 is not exerted upon the capacitors of the snubber circuits S4 to S7. These circumstances similarly apply to the snubber circuits S8 to S15 for the reactors 35 and 36. According to the present embodiment, therefore, it is possible to provide an inverter device which has a small size but a high efficiency without increasing the capacity of the snubber capacitors.

Figure 3:
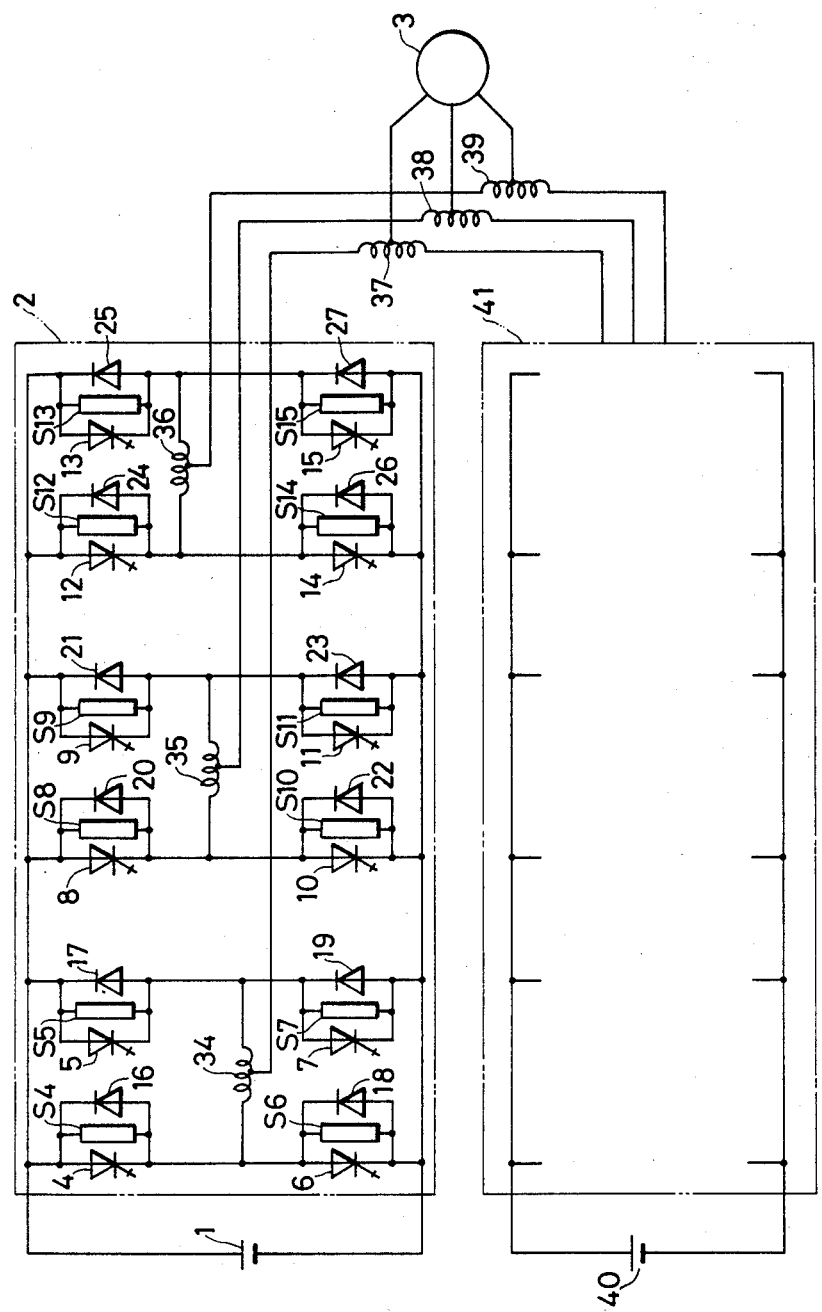
FIGS. 3 to 5 are circuit diagrams showing other embodiments of the present invention.

FIG. 3 shows the circuit construction of another embodiment of the present invention. According to this embodiment, there is added a unit inverter 41 which has the same construction as that of the inverter device 2 shown in FIG. 1, and there are connected between the corresponding a.c. output terminals of the two unit inverters 2 and 41 current balancing reactors 37, 38 and 39 which have their respective intermediate points connected with the load 3. A d.c. power source 40 is provided for the unit inverter 41. According to the present embodiment, the current balances of the unit inverters 2 and 41 can be ensured by the actions of the reactors 37, 38 and 39, and the influences of those leakage inductances are not exerted upon the capacitors of the snubber circuits likewise the case of FIG. 1.

Figure 4:
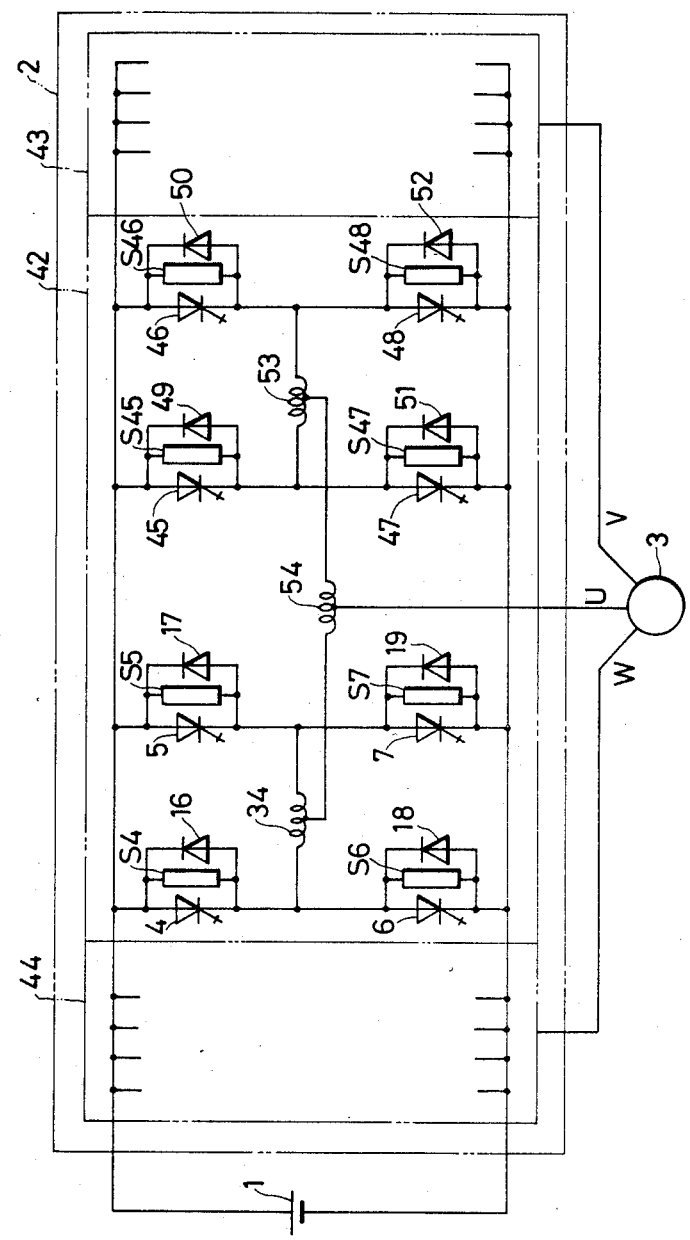

FIG. 4 shows the circuit construction of still another embodiment of the present invention. In the present embodiment, the group of four unit switching circuits each having GTOs connected in series provides one phase. Only a unit inverter 42 fo the U-phase is shown in detail. As shown, the current balancing reactor 34 is connected between the series node of the GTOs 4 and 6 and the series node of the GTOs 5 and 7, and another current balancing reactor 53 is connected between the series node of the GTOs 45 and 47 and the series node of GTOs 46 and 48. Between intermediate points of those two reactors 34 and 53, moreover, there is connected still another current balancing reactor 54, which has its intermediate point leading t a U-phase a.c. output terminal. The constructions of unit inverters 43 and 44 for V- and W-phases are made the same as that of the aforementioned U-phase unit inverter 42. With these constructions, the currents of the parallel GTOs can be balanced even if the number of the parallel connections of the GTOs increases, and the influences of the leakage inductances of the current balancing reactors are not exerted upon the capacitors of the snubber circuits likewise the embodiment of FIG. 1.

Figure 5:
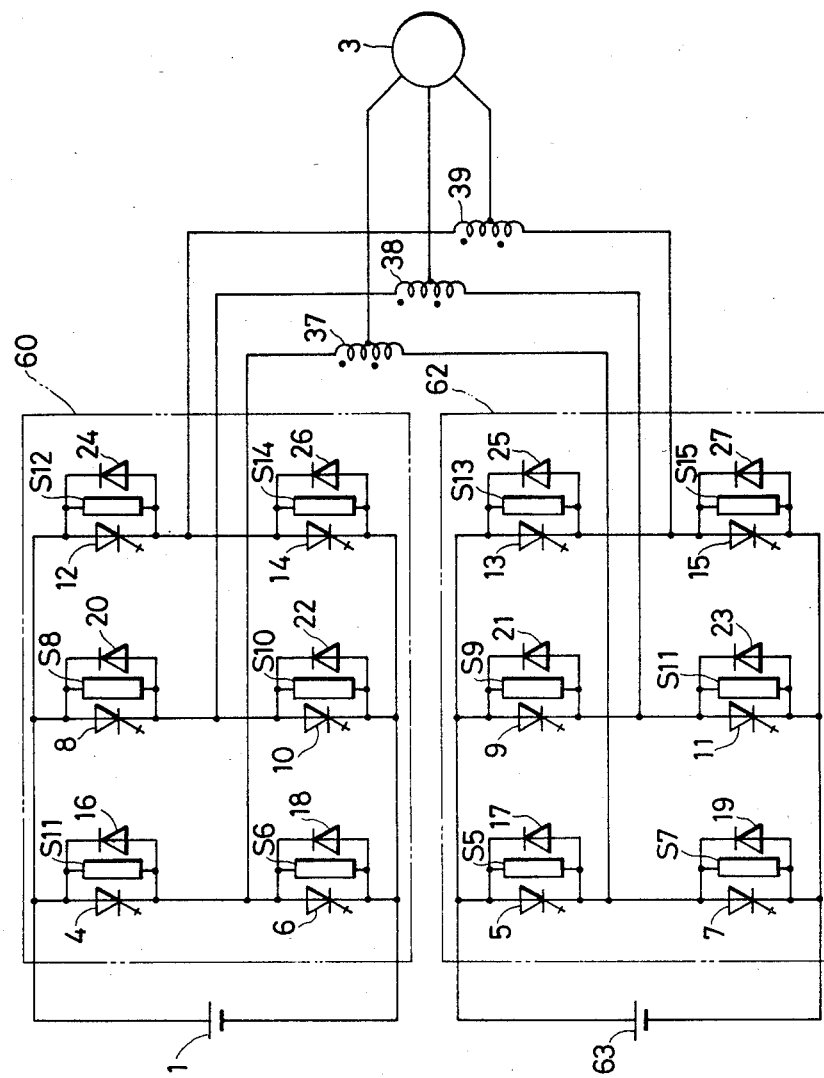

FIG. 5 shows the circuit construction of a further embodiment of the present invention. The present embodiment is constructed of two unit inverters 60 and 62 which have GTOs bridge-connected with one another. The d.c. power source 1 is provided for the unit inverter 60, whereas a d.c. power source 63 is provided for the unit inverter 62.

Between the corresponding a.c. output terminals of the two unit inverters 60 and 62, respectively, there are connected the current balancing reactors 37, 38 and 39, which have their respective intermediate points connected with the load 3. According to the present embodiment, the currents of the unit inverters 60 and 62 can be balanced by the coactions of the reactors 37, 38 and 39, and the influences of the leakage inductances of the reactors 37, 38 and 39 are not exerted upon to the capacitors of the snubber circuits likewise the embodiment of FIG. 1.

Although the foregoing description has been directed to the circuit constructions using the GTOs, the present invention can naturally be applied to any inverter device making use of switching elements such as typical thyristors or transistors.

Moreover, the present invention can be likewise applied not only to the three-phase inverter device but also to a single-phase inverter device and further not only to the voltage type inverter device but also to a current type inverter device.

As has been described hereinbefore, according to the present invention, the leakage induction components in the coils of the current balancing reactors are made independent of the generation of the excessive voltage, when the respective GTOs are turned off, by the circuit constructions. As a result, the capacitors of the snubber circuits are sufficient, if they have capacities enough to suppress the excessive voltage due to the wiring inductance components, so that they can have lower capacities than those of the example of the prior art. As a result, the energy to be consumed by the resistors of the snubber circuits can be reduced, and the efficiency of the device as a whole can be enhanced. Since the capacities of the capacitors of the snubber circuits can be made lower than those of the prior art, moreover, the time period required for charging or discharging those capacitors can be shortened to increase the number of the pulses in a pulse width modulation (i.e., PWM) control thereby to provide an effect that the elimination of the high-frequency components of the output voltage of the inverter can be enhanced.

What is claimed is:

1. An inverter device comprising:

a unit inverter including a plurality of groups of unit switching circuits connected in parallel with a d.c. power source, each group of unit switching circuits including first and second unit switching circuits and forming one phase of said unit inverter, wherein said first unit switching circuit comprises an upper portion comprised of at least one gate turn-off thyristor and a lower portion comprised of at least one gate turn-off thyristor, said upper and lower portions being coupled directly in series with one another so that the gate turn-off thyristors of said upper and lower portions are in series with one another with a first series node being located between said upper and lower portions of said first unit switcing circuit, and wherein said second unit switching circuit comprises an upper portion comprised of at least one gate turn-off thyristor and a lower portion comprised of at least one gate turn-off thyristor, said upper and lower portions being coupled directly in series with one another so that the gate turn-off thyristors of said upper and lower portions are in series with one another with a second series node being located between said upper and lower portions of said second unit switching circuit;

first current balancing reactors respectively connected between said first and second nodes of the respective groups of unit switching circuits such that said first current balancing reactors are not connected in series between the upper and lower portions of any one unit switching circuit; and a.c. output terminals respectively leading out from center points of the first current balancing reactors of the respective groups.

2. An inverter device according to claim 1, further comprising:

another unit inverter;

second current balancing reactors respectively connected between the corresponding a.c. output terminals of the respective two unit inverters; and means for connecting a load between intermediate points of said second reactors.

3. An inverter device according to claim 1, wherein said unit inverter includes three of said plurality of groups to form a three-phase inverter.

4. An inverter device according to claim 1, further comprising a snubber circuit in parallel with each of said gate turn-off thyristors.

5. An inverter device according to claim 4, wherein said snubber circuit includes a parallel connection of a resistor and a diode and further includes a capacitor connected in series with said parallel connection to prevent an influence of a leakage inductance of said first current balancing reactors on the capacitors of said snubber circuits.

6. An inverter device comprising:

a plurality of groups of first, second, third and fourth unit switching circuits connected in parallel with a d.c. power source and each unit switching circuit having an upper portion comprised of at least one gate turn-off thyristor and a lower portion comprised of at least one gate turn-off thyristor, said upper and lower portions being coupled directly in series with one another so that the gate turn-off thyristors of said upper and lower portions are in series with one another with a series node located between the upper and lower portions of each unit switching circuit;

first current balancing reactors resepectively connected between said nodes of series connected gate turn-off thyristors of the first and second unit switching circuits and between said nodes of series connected gate turn-off thyristors of the third and fourth unit switching circuits of each group such that said first current balancing reactors are not connected in series between the upper and lower portions of any one unit switching circuit;

second current balancing reactors connected between center points of said first reactors; and an a.c. output terminal leading out from center points of said second reactors.

7. An inverter device comprising:

a unit inverter including a first plurality of groups of unit switching circuits connected in parallel with a first d.c. power source and each unit switching circuit having an upper portion comprised of at least one gate turn-off thyristor and a lower portion comprised of at least one gate turn-off thyristor, said upper and lower portions being coupled directly in series with one another so that the gate turn-off thyristors of said upper and lower portions are in series with one another with a series node located between the upper and lower portions of each unit switching circuit and a second plurality of groups of unit switching circuits connected in parallel with a second d.c. power source and each unit switching circuit having an upper portion comprised of at least one gate turn-off thyristor and a lower portion comprised of at least one gate turn-off thyristor, said upper and lower portions being coupled directly in series with one another so that the gate turn-off thyristors of said upper and lower portions are in series with one another with a series node located between the upper and lower portions of each unit switching circuit;

first current balancing reactors respectively connected between the corresponding nodes of the series connected gate turn-off thyristors of the first plurality of groups and the second plurality of groups such that said first current balancing reactors are not connected in series between the upper and lower portions and any one unit switching circuit; and a.c. output terminals respectively leading out from center ponts of the first current balancing reactors.

* * * * *